(12) United States Patent
Lee et al.

(10) Patent No.: US 10,951,153 B2
(45) Date of Patent: Mar. 16, 2021

(54) APPARATUS AND METHOD FOR CONTROLLING INVERTER DRIVING MOTOR

(71) Applicants: Hyundai Motor Company, Seoul (KR); Kia Motors Corporation, Seoul (KR)

(72) Inventors: Yong Jae Lee, Gyeonggi-do (KR); Joo Young Park, Gyeonggi-do (KR); Jae Ho Hwang, Daejeon (KR); Mu Shin Kwak, Gyeonggi-do (KR); Su Hyun Bae, Daegu (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/654,351

(22) Filed: Oct. 16, 2019

(65) Prior Publication Data

US 2020/0343848 A1 Oct. 29, 2020

(30) Foreign Application Priority Data

Apr. 24, 2019 (KR) .................. 10-2019-0047608

(51) Int. Cl.
*H02P 27/00* (2006.01)
*H02P 27/08* (2006.01)

(52) U.S. Cl.
CPC ................ *H02P 27/085* (2013.01)

(58) Field of Classification Search
USPC ........................................ 318/560
See application file for complete search history.

(56) References Cited

U.S. PATENT DOCUMENTS

2020/0166908 A1* 5/2020 Lim ...................... H02P 27/12

FOREIGN PATENT DOCUMENTS

| KR | 20010073638 A | 8/2001 |
|----|---------------|--------|
| KR | 20100062638 A | 6/2010 |

* cited by examiner

*Primary Examiner* — Bentsu Ro
(74) *Attorney, Agent, or Firm* — Mintz Levin Cohn Ferris Glovsky and Popeo, P.C.; Peter F. Corless (57) ABSTRACT

An apparatus for controlling an inverter driving a motor is provided. The apparatus includes a current controller that generates a voltage instruction for causing a current detection value, obtained by measuring a current provided from an inverter to a motor, to correspond to a current instruction for driving the motor. A voltage modulator generates a pulse width modulation signal for controlling on/off states of switching devices in the inverter at a predetermined switching frequency based on the voltage instruction. A frequency determiner determines the switching frequency based on driving information of the motor, determines a plurality of synchronization frequencies based on a speed of the motor, and randomly selects and determines one of the plurality of synchronization frequencies as the switching frequency.

18 Claims, 7 Drawing Sheets

APPARATUS AND METHOD FOR CONTROLLING INVERTER DRIVING MOTOR

CROSS-REFERENCE TO RELATED APPLICATION

This application claims the priority benefit of Korean Patent Application No. 10-2019-0047608, filed on Apr. 24, 2019, the disclosure of which is incorporated herein by reference.

BACKGROUND OF THE INVENTION

1. Field of the Invention

The present disclosure relates to an apparatus for controlling an inverter driving a motor and, more particularly, to an apparatus and method for controlling an inverter driving a motor, the apparatus and method being able to reduce both of noise and electronic waves due to diffusion of the frequency of a pulse width modulation signal for operating a switching device of the inverter, and a harmonic frequency due to synchronization of the frequency of the pulse width modulation signal to a motor speed.

2. Description of the Prior Art

In general, a system for controlling a motor includes a power storage device (e.g., a battery), an inverter that converts direct current (DC) power stored in the power storage device into 3-phase alternating current (AC) power, a motor, and a controller switching the inverter based on a current instruction, which is generated based on a torque instruction for driving the motor, and an actual measurement current provided to the motor. The inverter includes a plurality of switching devices and the switching devices are controlled in Pulse Width Modulation (PWM), whereby AC power may be generated. The AC power generated by the inverter is provided to the motor, whereby the motor is operated.

As a method of controlling the switching devices in the inverter, a method of performing pulse width modulation control on the switching devices at a switching frequency synchronized with a motor speed is known. Such synchronization pulse width modulation has an advantage in that the switching frequency is changed based on the speed of the motor, and thus, it may be possible to reduce a harmonic component that is shown in a band corresponding to a multiple of an integer of the switching frequency, but has a defect that switching noise and vibration are substantial.

To solve the defect due to a pulse width modulation signal of a fixed switching frequency, there is known a Random Pulse Width Modulation (RPWM) technique that momentarily distributes a switching frequency band. When the RPWM technique is applied, it may be possible to suppress noise or vibration through energy distribution, but a switching frequency is randomly changed, and thus, control ability is deteriorated and it is difficult to remove harmonic components.

The description provided above as a related art of the present disclosure is just for helping understanding the background of the present disclosure and should not be construed as being included in the related art known by those skilled in the art.

SUMMARY

An aspect of the present disclosure is to provide an apparatus and method of controlling an inverter for operating a motor, the apparatus and method having the advantage of the synchronization pulse width modulation that reduces a harmonic frequency and the advantage of the random pulse width modulation that reduces noise and vibration by randomly changing a pulse width modulation frequency for operating switching devices in the inverter providing driving power to the motor and by randomly determining the pulse width modulation frequency as one of a plurality of synchronization frequencies synchronized to the speed of the motor.

In view of the foregoing, an aspect of the present disclosure provides an apparatus for controlling an inverter driving a motor that may include: a current controller configured to generate a voltage instruction for causing a current detection value obtained by measuring a current provided from an inverter to a motor, to follow a current instruction for driving the motor; a voltage modulator configured to generate a pulse width modulation signal for controlling on/off states of switching devices in the inverter at a switching frequency based on the voltage instruction; and a frequency determiner configured to determine the switching frequency based on driving information of the motor, determine a plurality of synchronization frequencies based on a speed of the motor, and randomly select and determine one of the plurality of synchronization frequencies as the switching frequency.

In an exemplary embodiment of the present disclosure, the frequency determiner may be configured to determine a change range of the switching frequency based on the driving information, determine the predetermined plurality of synchronization frequencies that may be used when synchronization pulse width modulation is applied based on a speed of the motor within the determined change range, and may randomly select and determine one of the determined plurality of synchronization frequencies as the switching frequency.

In addition, the frequency determiner may include: a random band creator configured to determine a change width of the switching frequency based on the driving information; a fundamental frequency creator configured to generate a fundamental frequency that is a reference for determining the switching frequency; a multiple determiner configured to determine a plurality of multiples for determining the predetermined plurality of synchronization frequencies that may be used when synchronization pulse width modulation is applied; and a switching frequency calculator configured to determine a multiple selection range based on a maximum frequency and a minimum frequency, which are generated by applying the frequency change width around the fundamental frequency, and the rotational speed of the motor, randomly selecting one of multiples within the multiple selection range from the multiples determined by the multiple determiner, and configured to determine the switching frequency based on the randomly selected multiple and the rotational speed of the motor.

In an exemplary embodiment of the present disclosure, the switching frequency calculator may be configured to determine a maximum value and a minimum value of the multiple selection range by dividing each of the maximum frequency and the minimum frequency by an electrical frequency corresponding to a speed of the motor. The switching frequency calculator may also be configured to determine the switching frequency by multiplying the randomly selected multiple by an electrical frequency corresponding to a speed of the motor.

The random band creator may include: a cost function calculator configured to calculate one cost value using a cost function having all of a plurality items of the input driving information as variables; and a data map configured to store, in advance, the frequency change width mapped to the cost value, receive input of the cost value calculated by the cost function calculator, and output a frequency change width mapped to the cost value.

Additionally, the random band creator may include: a plurality of cost function calculators respectively including cost functions respectively having a plurality items of the input driving information as variables and configured to calculate a cost value for each of the items of driving information; and a data map configured to store in advance the frequency change width mapped to the cost value, receive input of a maximum value of the cost values calculated by the plurality of cost function calculators, and output a frequency change width mapped to the maximum value.

In an embodiment of the present disclosure, the driving information may include the current instruction, the current detection value, temperature of the inverter, temperature of the motor, and a speed of the motor. The cost function calculator may include a cost function that outputs a larger cost value as a tendency of the input motor driving information showing a state in which controllability is deteriorated increases, and the data map may be mapped to decrease the frequency change width as the cost values increase.

The apparatus may further include a voltage modulator configured to generate a carrier signal having a triangular waveform having a frequency corresponding to the switching frequency determined by the frequency determiner and generate the pulse width modulation signal having a spherical waveform by comparing the voltage instruction and the carrier signal.

In view of the foregoing, another aspect of the present disclosure provides a method for controlling an inverter driving a motor that may include: generating a fundamental frequency that is a reference for determining a switching frequency of a switching device in an inverter; determining a frequency change width for changing the switching frequency based on driving information of a motor that is operated by driving power provided from the inverter; determining a plurality of multiples for determining a plurality of predetermined synchronization frequencies that may be used when synchronization pulse width modulation is applied; determining a frequency change range by applying the frequency change width around the fundamental frequency; determining a multiple selection range by applying a speed of the motor to a maximum frequency and a minimum frequency of the frequency change range; randomly selecting one multiple from a plurality of multiples existing between a maximum value and minimum value of the multiple selection range of the multiples determined by the determining of a plurality of multiples; and determining the switching frequency based on the multiple randomly selected in the selecting of one multiple and a speed of the motor.

In an exemplary embodiment of the present disclosure, the method may further include generating a carrier signal having a triangular waveform having a frequency that corresponds to the switching frequency determined in the determining of the switching frequency, and generating a pulse width modulation signal having a spherical waveform by comparing the carrier signal and a voltage instruction determined such that a current detection value obtained by measuring a current provided from the inverter to the motor follows a current instruction for driving the motor.

The determining of a multiple selection range may include determining a maximum value and a minimum value of the multiple selection range by dividing each of the maximum frequency and the minimum frequency by an electrical frequency corresponding to a speed of the motor. In addition, the determining of the switching frequency may include determining the switching frequency by multiplying the randomly selected multiple by an electrical frequency corresponding to a speed of the motor.

The determining of a frequency change width may include calculating one cost value using a cost function having all of a plurality items of the driving information as variables, and determining the frequency change width by inputting the calculated cost value to a data map configured to store, in advance, the frequency change width mapped to the cost value. In addition, the determining of a frequency change width may include calculating a plurality of cost values using cost functions respectively having a plurality items of the driving information as variables, and determining the frequency change width by inputting a maximum value of the plurality of cost values to a data map configured to store, in advance, the frequency change width mapped to the cost value.

In an exemplary embodiment of the present disclosure, the driving information may include the current instruction, the current detection value, temperature of the inverter, temperature of the motor, and a speed of the motor. The cost function may output a larger cost value as a tendency of the motor driving information showing a state in which controllability is deteriorated increases, and the data map may be mapped to decrease the frequency change width as the cost values increase.

According to the apparatus and method for controlling an inverter driving a motor, a switching frequency of an inverter is randomly changed such that the randomly changed switching frequency becomes one of several switching frequencies that may be applied to synchronization pulse width control, thereby being able to achieve the effect of reducing noise and vibration by random pulse width modulation control and the effect of reducing a harmonic frequency by synchronization pulse width control.

The effects of the present disclosure are not limited to the effects described above and other effects may be clearly understood by those skilled in the art from the following description.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereafter, an apparatus and method for controlling an inverter driving a motor according to various embodiments are described in detail with reference to the accompanying drawings.

Figure 1:
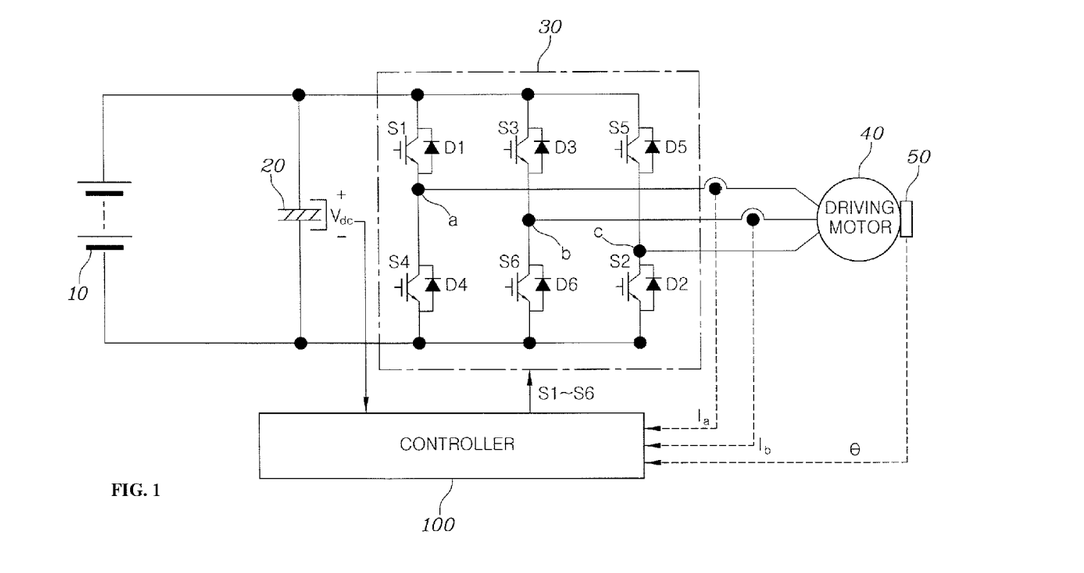
FIG. 1 is a circuit diagram of a motor driving system to which an apparatus and method for controlling an inverter driving a motor according to an exemplary embodiment of the present disclosure is applied.

FIG. 1 is a circuit diagram of a motor driving system to which an apparatus for controlling an inverter driving a motor according to an exemplary embodiment of the present disclosure is applied. Referring to FIG. 1, a motor driving system to which an apparatus for controlling an inverter driving a motor according to an exemplary embodiment of the present disclosure is applied may include an energy storage device 10, a DC link capacitor 20 connected between both ends of the energy storage device, an inverter 30, a motor 40, a rotational angle sensor 50, and a controller 100.

The energy storage device 10 may be configured to store electric energy for driving the motor 40 in a DC type, such as a battery, and output DC power. The DC link capacitor 20 may be connected to both ends of the energy storage device 10 and may be configured to generate a DC link voltage $V_{dc}$ by being charged. The DC link voltage $V_{dc}$ becomes an input voltage of the inverter 30. The inverter 30 may be configured to convert DC power stored in and provided from the energy storage device 10 into AC power for driving the motor and may include a plurality of switching devices S1 to S6 of which on/off states are controlled by pulse width modulation signals provided from the controller 100. Switching of the inverter 30 may be understood as indicating switching of a 3-phase voltage that is output from the inverter.

The motor 40 may be configured to generate torque by receiving input of 3-phase AC power provided from the inverter 30 and all of various types of motors that is known in the art may be employed. In eco-friendly vehicles, the motor is a motor that provides torque to driving wheels of the vehicle and may be referred to as a driving motor. The rotational angle sensor 50 may be configured to detect the rotational position of a rotor of a motor, that is, the rotational angle of a rotor of a motor, detect the angle of a rotor of the motor 40 and continuously output rotational angle detection signals including information regarding the detected rotational angles of the rotor. For example, the rotational angle sensor 40 may be a resolver etc.

The controller 100 may be configured to perform pulse width modulation type of control that appropriately adjusts duty cycles (duty ratios) of the switching devices S1~S6 of the inverter 30 to fundamentally adjust the torque of the motor to a desired value (torque instruction). Accordingly, the controller 100 may be configured to derive torque-related information of the motor 40 that is in operation based on a signal provided from the rotational angle sensor 50 and values $I_a$ and $I_b$ obtained by detecting a current that is provided to the motor 40. Further, the controller 100 may be configured to operate the switching devices S1~S6 in the inverter 30 so that the motor 40 may output a value that corresponds to a torque instruction value, based on a torque instruction value for the motor 40 input from the outside (e.g., a target torque value desired to be obtained through the motor 40) and torque-related information of the motor 40 that is current in operation.

In an exemplary embodiment of the present disclosure, the controller 100 may be configured to determine the frequency of a pulse width modulation signal for controlling on/off of the switching devise S1~S6 in the inverter 30, and a switching frequency. In addition, the controller 100 may be configured to determine a switching frequency within a predetermined change width, determine a plurality of synchronization frequencies based on the speed of the motor 40 within a predetermined change width, and determine a switching frequency by randomly selecting one of the determined synchronization frequencies.

By determining a switching frequency, an effect that reduces switching noise and vibration that are generated by frequency concentration and may be expected by applying a Random Pulse Width Modulation (RPWM) method and an effect that reduces a harmonic frequency may be expected by applying synchronization pulse width modulation may be both achieved. The controller 100 in the system shown in FIG. 1 may be an inverter controller according to the present disclosure and a method of controlling an inverter that is performed by the controller 100 may be the method of controlling an inverter according to the present disclosure.

Figure 2:
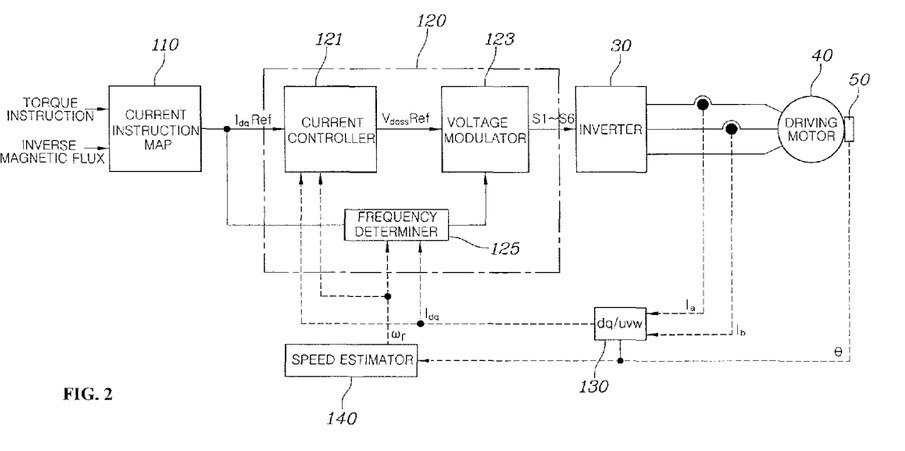
FIG. 2 is a block diagram showing in more detail the apparatus for controlling an inverter driving a motor according to an exemplary embodiment of the present disclosure.

FIG. 2 is a block diagram showing in more detail the apparatus for controlling an inverter driving a motor according to an exemplary embodiment of the present disclosure, which may be understood as showing the detailed configuration of the controller 100 of FIG. 1 and a system composed of the inverter 30 that is operated by the controller 100, the motor 40 that is operated by a 3-phase voltage from the inverter 30, etc.

Referring to FIG. 2, the apparatus (e.g., the controller 100 of FIG. 1) for controlling or operating an inverter driving a motor according to an exemplary embodiment of the present disclosure may include: a current instruction map 110 configured to receive input of a torque instruction and inverse magnetic flux of a motor that are input from the outside, and output a corresponding current instruction $I_{dp}$REF; a current control desk 120 configured to generate a voltage instruction $V_{dpss}$REF for causing a current detection value obtained by detecting a current provided to the motor 40 follow or correspond to the current instruction $I_{dp}$REF by comparing the current instruction $I_{dp}$REF with the current detection value, and generate a gate signal for controlling tuning-on/off of the switching devices S1~S6 through pulse width modulation such that output of the inverter 20 corresponding to the $V_{dpss}$REF is generated; a coordinate converter 130 configured to convert a value obtaining by detecting phase currents Ia and Ib provided from the motor 40 into a d/q-axis current ($I_{dq}$); and a speed estimator 140 configured to derive a rotational speed of the motor 40 using the position of rotor of the motor detected by the rotational angle sensor 50.

A current instruction $I_{dp}$REF that is simultaneously mapped to a torque instruction for the motor and inverse magnetic flux of the motor 40 may be stored in advance in the current instruction map 110. Accordingly, the current instruction map 110 may be configured to receive input of a torque instruction of a motor that is input from an external host controller etc. and a value obtained by detecting inverse magnetic flux output from the motor and output a corresponding current instruction $I_{dp}$REF. The current instruction $I_{dp}$REF may have the type of a d/q-axis current instruction of a stationary coordinate system.

Although it is described in the exemplary embodiment of FIG. 2 that the current instruction map 110 outputs a current instruction $I_{dp}$REF mapped to two values by taking a torque instruction for the motor and inverse magnetic flux of the motor 40 as input, it is only an example and it may be possible to output a current instruction based on other types of input values and using a map to which the values are mapped. Further, the current instruction map 110 is only a methodological example that may be applied to generate a current, and it may be possible to derive a current instruction by performing methods other than a map, for example, by performing calculation by substituting a specific input value into a predetermined formula.

The current control desk 120 may include a current controller 121, a voltage modulator 123, and a frequency determiner 125. The current controller 121 may be provided with a d/q-axis current instruction $I_{dp}$REF from the current instruction map 110, may be provided with a value $I_{dq}$ obtained by converting current values Ia and Ib, which are obtained by actually measuring a current provided from the coordinate converter 130 to the motor, into a d/q-axis current, and may be provided with a rotational speed (rotational frequency) $\omega_r$ of the motor estimated by the speed estimator 140. The current controller 121 may be configured to generate a voltage instruction $V_{dpss}$Ref using the provided information.

In particular, the current controller 121 may be configured to generate a voltage instruction $V_{dpss}$Ref using a difference component between a d/q-axis current $I_{dp}$REF output from the current instruction map 110 and an actually measured d/q-axis current $I_{dq}$. The current controller 121 may be implemented as a proportional-integral (PI) controller and may be configured to generate a d/q-axial voltage instruction $V_{dqss}$Ref that may control the actually measured d/q-axial current $I_{dq}$ to follow the current instruction $I_{dp}$REF by performing proportional integration on the difference component between the d/q-axis current $I_{dp}$REF and the actually measured d/q-axis current $I_{dg}$.

The voltage modulator 123 may be configured to receive input of the voltage instruction $V_{dqss}$REF and a switching frequency (or a carrier frequency) generated by the frequency determiner 125 and generate a pulse width modulation signal for determining on/off states of the switching devices in the inverter 30 based on the voltage instruction and the switching frequency. For example, the voltage modulator 123 may be configured to generate a carrier signal having a triangular waveform following the switching frequency (e.g., carrier frequency) determined by the frequency determiner 125 and may be configured to generate a pulse width modulation signal having a spherical waveform by comparing the carrier signal with the d/q-axial voltage instruction $V_{dqss}$Ref.

The pulse width modulation signal output from the voltage modulator 123 may be provided to gates of the switching devices S1~S6 in the inverter 30, whereby on/off of the switching devices S1~S6 is determined. Accordingly, a 3-phase AC voltage (3-phase AC current) that is provided from the inverter 30 to the motor 40 may be determined.

The frequency determiner 125 may be configured to determine a switching frequency of the inverter 30 and randomly determine a switching frequency within a predetermined range and provide the switching frequency to the voltage modulator 123. In particular, the frequency determiner 125 may be configured to receive several items of information in relation with driving of the motor 40, determine a change width of a switching frequency based on the information, and determine a switching frequency that is randomly changed in the determined change width.

Figure 3:
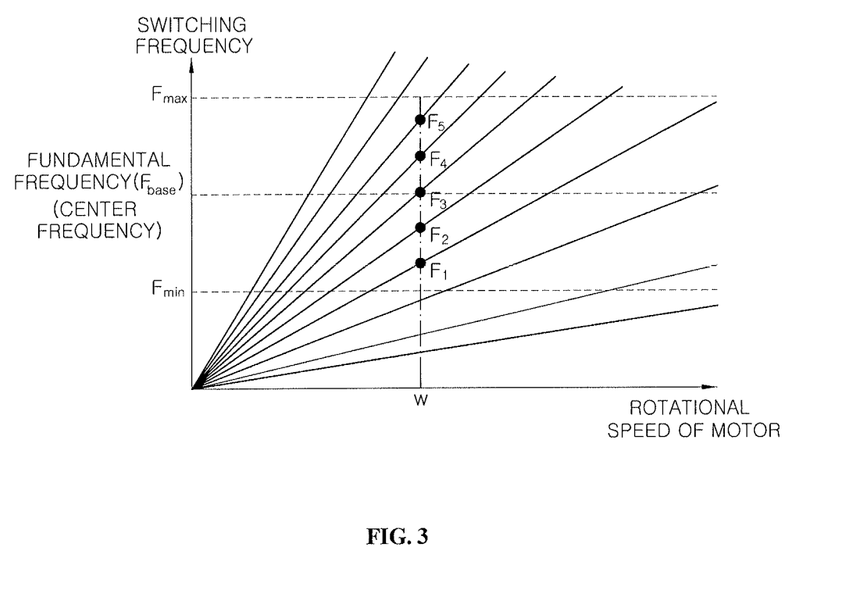
FIG. 3 is a graph illustrating a switching frequency determination technique of a frequency determiner of the apparatus for controlling an inverter driving a motor according to an exemplary embodiment of the present disclosure.

FIG. 3 is a graph illustrating a switching frequency determination technique of a frequency determiner of the apparatus for controlling an inverter driving a motor according to an exemplary embodiment of the present disclosure. Referring to FIG. 3, the frequency determiner 125 may be configured to determine a frequency change range around a specific fundamental frequency $F_{base}$ and determine a plurality of synchronization switching frequencies F1~F6 set in advance to correspond to the speed $\omega$ of the motor 40 to apply synchronization pulse width modulation between the maximum value $F_{max}$ and the minimum value $F_{min}$ of the frequency change range.

In the synchronization pulse width modulation, the rotational speed of a motor and a corresponding switching frequency may have a linear relationship and the relationship may be shown as a plurality of straight lines, as shown in FIG. 3. In general, a switching frequency may be determined as a multiple of 6n, a multiple of 12n, or a multiple of 6(2n−1) (n is a natural number) of an electrical rotational frequency corresponding to the rotational speed of a motor. In common synchronization pulse width modulation, it is set to divide the rotational speed of a motor into a plurality of periods and apply one straight in advance to each period. Accordingly, when common synchronization pulse width modulation is applied, one fundamental frequency is set in advance for each motor speed.

In several exemplary embodiments of the present disclosure, the frequency determiner 125 may be configured to set in advance a frequency change range around a fundamental frequency, determine a plurality of switching frequencies F1~F6 corresponding to actually detected motor speeds within the frequency change range using a plurality of motor speed-switching frequency straight line set in the synchronization pulse width modulation, and freely select one of the found switching frequencies F1~F6, and determine the selected switching frequency as the frequency of a pulse width modulation signal for operating the switching devices S1~S6 of the inverter 30, that is, a switching frequency.

Figure 4:
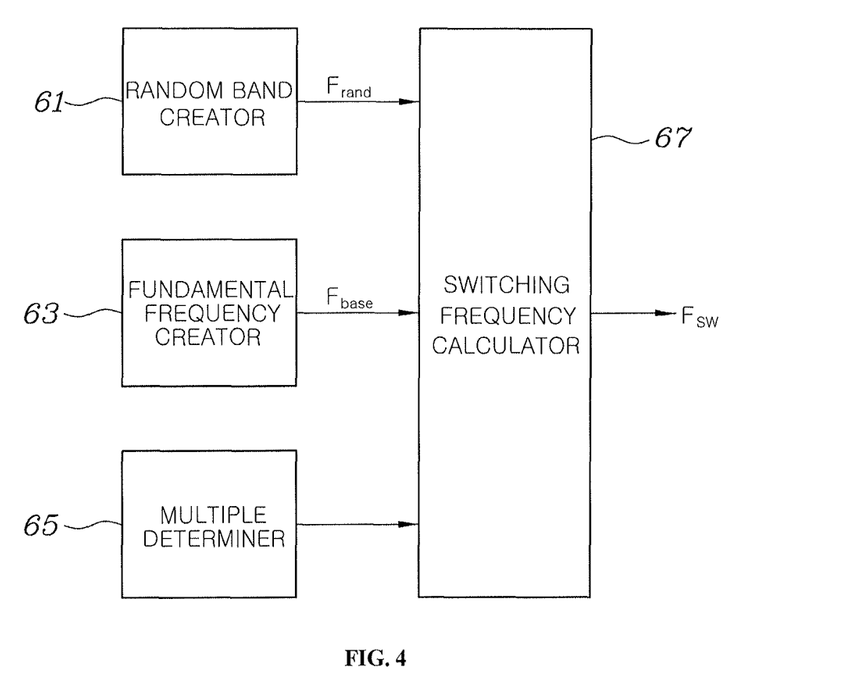
FIG. 4 is a block diagram showing in more detail the frequency determiner of the apparatus for controlling an inverter driving a motor according to an exemplary embodiment of the present disclosure.

For the operation of the frequency determiner 125 described above, the frequency determiner 125 may be configured, as shown in FIG. 4. FIG. 4 is a block diagram showing in more detail the frequency determiner of the apparatus for controlling an inverter driving a motor according to an exemplary embodiment of the present disclosure.

Referring to FIG. 4, the frequency determiner 125 may include: a random band creator 61 configured to determine a change width $F_{rand}$ of a switching frequency for changing the frequency of a pulse width modulation signal; a fundamental frequency creator 63 configured to generate a fundamental frequency $F_{base}$ that is the reference of the switching frequency; a multiple determiner 65 configured to determine a plurality of multiples for determining a plurality of synchronization frequency; and a switching frequency calculator 67 configured to determine a multiple selection range based on a maximum frequency and a minimum frequency, which are generated by applying a frequency change width around the fundamental frequency, and the rotational speed of the motor 40, randomly select one of multiples within the multiple selection range from the multiples determined by the multiple determiner 65, and calculate the switching frequency $F_{sw}$ based on the randomly selected multiple and the rotational speed of the motor 40.

The random band creator 61 may be configured to determine a frequency change width based on driving information of the motor. The random band creator 61 will be described in more detail below. The fundamental frequency determiner 63 may be configured to determine a center frequency for applying the frequency change width of the random band creator 61 and the center frequency may be a switching frequency that is applied to common pulse width modulation such as pulse width modulation to which a common fixed switching frequency is applied.

The multiple determiner 65 may be configured to determine a multiple corresponding to a plurality of synchronization frequency within a range to which a frequency change width is applied around the center frequency. For example, as shown in FIG. 3, when the speed of a motor (an electrical rotation frequency) is ω, it may be possible to determine a multiple corresponding to a straight line in a frequency change width (a multiple corresponding to 6n, 6(2n−1), or 12n of the speed of the motor) around the center frequency.

The switching frequency calculator 67 may be configured to determine the maximum value $F_{max}$ and the minimum value $F_{min}$ of a frequency change range by applying the frequency change width determined by the random band creator 61 to the fundamental frequency $F_{base}$ determined by the fundamental frequency generator 65, determine the range of a multiple by dividing the minimum value $F_{min}$ of the frequency change range by a value obtained by measuring the rotational speed of the motor 40, select multiples within a multiple selection range from the multiples determined by the multiple determiner 65, randomly select one of the selected multiples, and then determine a product of the randomly selected multiple and the speed of the motor 40 as a switching frequency $F_{sw}$.

As described above, the voltage modulator 123 may be configured to generate a carrier signal having a triangular waveform following the switching frequency $F_{sw}$ (carrier frequency) determined by the frequency determiner 125 and generate a pulse width modulation signal having a spherical waveform by comparing the carrier signal with the d/q-axial voltage instruction $V_{dqss}$Ref. On the other hand, in an exemplary embodiment of the present disclosure, it may be possible to determine the frequency change width of the random band creator 61 using at least some of several items of motor driving information such as a driving environment of a control state of a motor. In other words, the random band creator 61 may be configured to receive motor driving information and determine a frequency based on the motor driving information.

Figure 5:
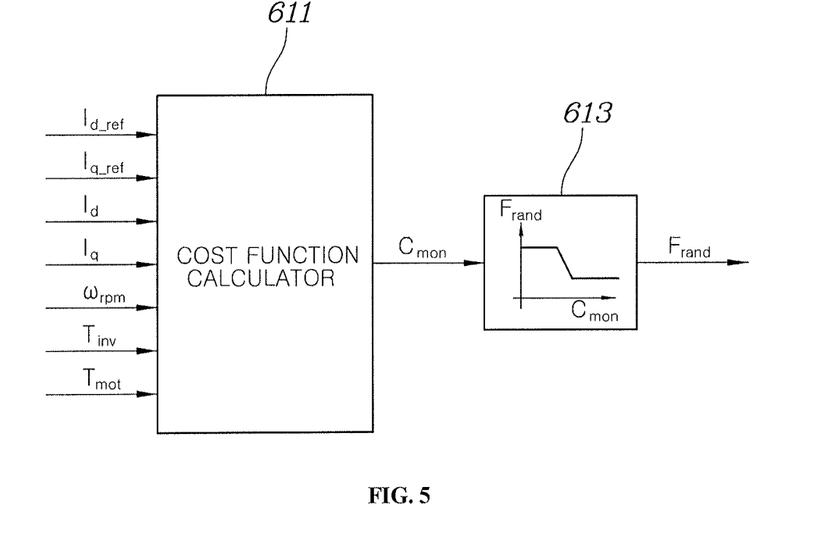
FIGS. 5 and 6 are block diagrams showing in more detail several examples of a random band creator that determines a frequency change width in the apparatus for controlling an inverter driving a motor according to an exemplary embodiment of the present disclosure.
Figure 6:
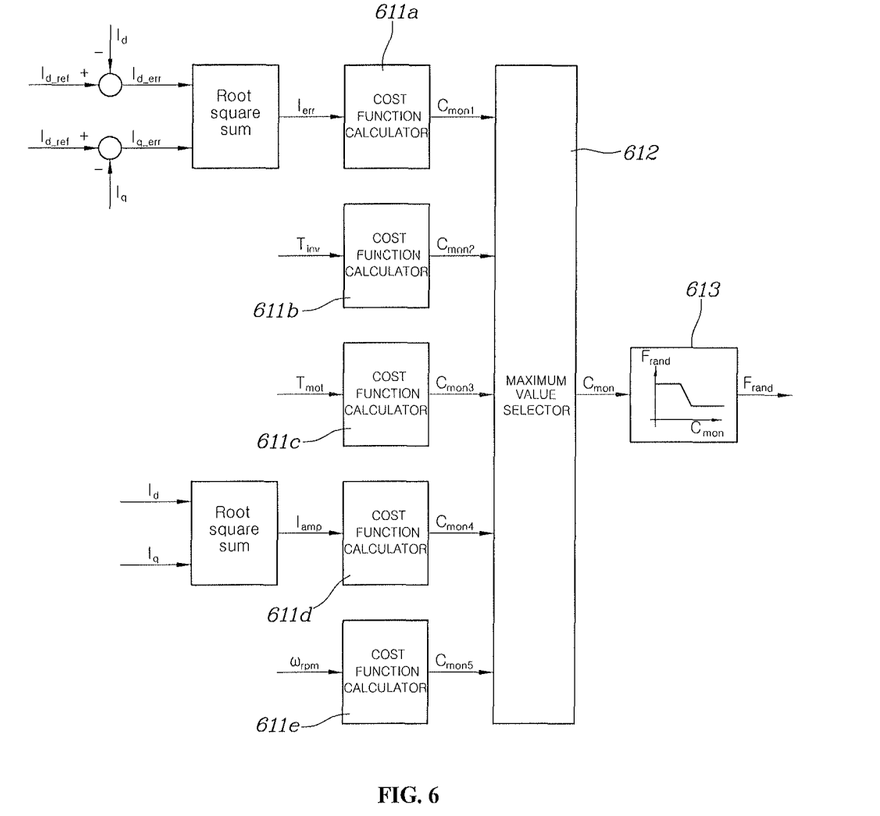

FIGS. 5 and 6 are block diagrams showing in more detail several examples of a random band creator configured to determine a frequency change width in the apparatus for controlling an inverter driving a motor according to an exemplary embodiment of the present disclosure. First, referring to FIG. 5, the random band creator 61 may include a cost function calculator 611 configured to generate a cost value $C_{mon}$ that is a reference for determining a frequency change width $F_{rand}$ using one cost function receiving various items of motor driving information and use the items of motor driving information as variables, and a data map 613 configured to store, in advance, a frequency change width $F_{rand}$ mapped to a cost value $C_{mon}$ and output a frequency change width $F_{rand}$ mapped to the cost value $C_{mon}$ calculated and input from the cost function calculator 611.

The motor driving information that is input to the cost function calculator 611 may be d/q current instructions $I_{d\_ref}$ and $I_{q\_ref}$ corresponding to a torque instruction for driving a motor, current detection values $I_d$ and $I_q$ obtained by detecting a current provided to the motor 40 from the inverter 30, the rotational speed $\omega_{rpm}$ of the motor 40, the temperature $T_{inv}$ of the inverter 30, the temperature $T_{mot}$ of the motor 40, etc. The cost function calculator 611 may include a cost function that generates a reference value (cost value) to determine an appropriate switching frequency change width $F_{rand}$ using the input various items of motor driving information. The cost function is a formula having input motor driving information as a variable and a weight may be added for the type of each motor driving information.

The data map 613 may be configured to store, in advance, a frequency change width $F_{rand}$ mapped to a cost value $C_{mon}$, and when input of the cost value $C_{mon}$ occurs, the data map 613 may be configured to output the frequency change width $F_{rand}$ mapped to the cost value $C_{mon}$. In the data map 613, the frequency change width $F_{rand}$ may have a type in which a limit value is set to a very low cost value or a very high cost value. In other words, the frequency change width $F_{rand}$ may have a maximum value and a minimum value that are set in advance and may be appropriately determined in accordance with a cost value in the range between the maximum value and the minimum value. The maximum value of the frequency change width $F_{rand}$ may be a value that may generate a maximum switching frequency that may stably operate the motor 40 and the minimum value of the frequency change width $F_{rand}$ may be 0, which corresponds to a case in which a switching frequency is set as a fundamental frequency and is not changed.

Referring to FIG. 6 showing another example of the random band creator 61, the random band creator 61 may include: a plurality of cost function calculators 611a to 611c that calculates a cost function individually for each of items of motor driving information such as d/q current instructions $I_{d\_ref}$ and $I_{q\_ref}$, d/q current detection values $I_d$ and $I_q$ obtained by detecting a current provided from the inverter 30 to the motor 40, the rotational speed $\omega_{rpm}$ of the motor 40, the temperature $T_{inv}$ of the inverter 30, and the temperature $T_{mot}$ of the motor 40; a maximum value selector 612 configured to select a maximum value from cost values $C_{mon1}$ to $C_{mon5}$ calculated by the cost function calculators 611a to 611e; and a data map 613 configured to store in advance a frequency change width $F_{rand}$ mapped to a cost value $C_{mon}$, receive input of a cost value selected by the maximum value selector 612, and output frequency change width $F_{rand}$ corresponding to the cost value.

According to the example shown in FIG. 6, unlike the example shown in FIG. 5, it may be possible to calculate a plurality of cost values by individually applying the cost function calculators 611a to 611e to values calculated using each or some of a plurality of items of motor driving information, and then determine frequency change width $F_{rand}$ for the maximum of the calculated cost values $C_{mon1}$ to $C_{mon5}$.

For example, a first cost function calculator 611a may be configured to calculate a cost value using a cost function having an average value of difference values of the d/q current instructions $I_{d\_ref}$ and $I_{q\_ref}$ and the d/q current detection values $I_d$ and $I_q$ obtaining by detecting a current provided from the inverter 30 to the motor 40 as a variable. A second cost function calculator 611b may be configured to calculate a cost value using a cost function having the inverter temperature $T_{inv}$ as a variable and a third cost function calculator 611c may be configured to calculate a cost value using a cost function having the motor temperature $T_{mot}$ as a variable. Further, a fourth cost function calculator 611d may be configured to calculate a cost value using a cost function having the average of d/q current detection values $I_{amp}$ as a variable and a fifth cost function calculator 611e may be configured to calculate a cost value using a cost function having the rotational speed $\dot{U}_{rpm}$ of the motor 40 as a variable.

To determine a switching frequency change width based on information that is the substantially influenced by a random change of a switching frequency of the cost values calculated as described above, the maximum value selector 612 may be configured to select the maximum value of several cost values $C_{mon1}$ to $C_{mon5}$, and determine a frequency change width $F_{rand}$ by taking a cost value where the data map 613 has a maximum value as input.

In FIGS. 5 and 6, as the tendency that the input motor driving information shows a state in which controllability is deteriorated increases, the cost function may output a larger cost value, and as the input cost values increase, data may be mapped to the data map to decrease the frequency change width $F_{rand}$. For example, it may be considered that as the average value of difference values of the d/q current instructions $I_{d\_ref}$ and $I_{q\_ref}$ and the d/q current detection values $I_d$ and $I_q$ obtaining by detecting a current provided from the inverter 30 to the motor 40 increases, motor control is appropriately performed. In particular, as the average value $I_{err}$ increases, the cost value may be increased and the frequency change width output from the data map may be decreased.

In other words, an exemplary embodiment of the present disclosure may improve controllability instead while decreasing the effect of reducing noise by reducing the frequency change width under a condition requiring an increase of controllability. The driving information deteriorating controllability, for example, may be an increase of inverter temperature $T_{inv}$, an increase of motor temperature $T_{mot}$, an increase of the average of d/q current detection values $I_{amp}$, an increase of the rotational speed $\dot{U}_{rpm}$ of the motor, etc. The lower the controllability by driving information, the larger the cost value, and accordingly, the frequency change width $F_{rand}$ may decrease. On the other hand, the present disclosure provides also a method of controlling an inverter that uses the apparatus for controlling an inverter driving a motor described above.

Figure 7:
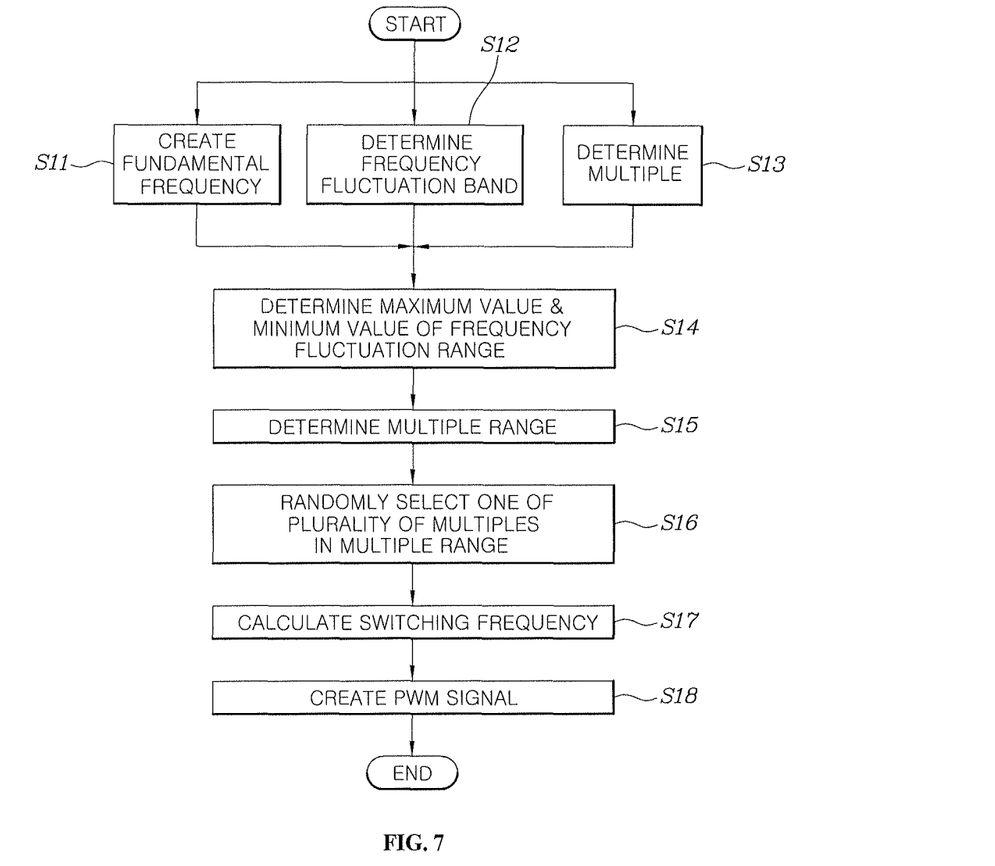
FIG. 7 is a flowchart of a method for controlling an inverter driving a motor according to an exemplary embodiment of the present disclosure.

FIG. 7 is a flowchart of a method for controlling an inverter driving a motor according to an exemplary embodiment of the present disclosure. The method described herein below may be executed by a controller. Referring to FIG. 7, a method for controlling an inverter driving a motor according to an exemplary embodiment of the present disclosure may include generating a fundamental frequency $F_{base}$ from the fundamental frequency creator 65 for switching of the inverter 30 (S11), determining a frequency change width $F_{rand}$ by receiving input of motor driving information by the random band creator 61 (S12), and determining a predetermined multiple that may be applied to a synchronization pulse width modulation technique (S13). Obviously, common inverter control, for example control such as generating a current instruction based on a torque instruction of a motor 40 input from the outside and generating a voltage instruction by comparing the current instruction with a current detection value obtained by detecting an actual current provided to the motor 40 may also be performed upon starting of motor driving.

In step S11 of generating a fundamental frequency $F_{base}$, a fundamental frequency may be generated using a common well-known technique that is applied to pulse width modulation by applying a fixed switching frequency. Further, in step S12, as described with reference to FIGS. 5 and 6, the method of creating one cost value using all of a plurality of items of motor driving information as variables and then determining a corresponding frequency change width $F_{rand}$ using a data map or a method of generating a cost value for each of a plurality of motor driving information and then determining a corresponding frequency change width $F_{rand}$ based on the maximum value of the cost values may be selectively applied.

In step S13, a multiple (6n, 12n, or 6(2n−1) in which n is a natural number) of the rotational speed of a motor (electrical rotational frequency) pertaining to a frequency change width may be determined around a center frequency by the multiple determiner 65. Next, the switching frequency calculator 67 may be configured to calculate a switching frequency Fsw using the values determined in steps S11 to S13. First, the switching frequency calculator 67 may be configured to determine a frequency change range by applying the frequency change width $F_{rand}$ determined in step S12 around the fundamental frequency $F_{base}$ created in step S11. In this process, a maximum value $F_{max}$ and a minimum value $F_{min}$ of the frequency change range created by applying the frequency change width around the fundamental frequency $F_{base}$ may be calculated (S14).

The switching frequency calculator 67 may be configured to determine a multiple selection range by applying the speeds of the motor 40 measured at the maximum value $F_{max}$ and the minimum value $F_{min}$ of the frequency change range (S15). The maximum value $N_{max}$ of the multiple selection range may be determined by dividing the maximum value $F_{max}$ of the frequency change range by an electrical frequency Fe corresponding to the speed of the motor and the minimum value $N_{min}$ of the multiple selection range may be determined by dividing the minimum value $F_{min}$ of the frequency change range by an electrical rotational frequency Fe corresponding to the speed of the motor 40. The electrical rotational frequency (electrical frequency) Fe used in the description of several exemplary embodiments of the present disclosure indicates an electrical rotational speed of a motor and may be obtained by multiplying a mechanical rotational frequency by a pole pair number of the motor.

Further, the switching frequency calculator 67 may be configured to randomly select one multiple from a plurality of multiples existing between the maximum value $N_{max}$ and the minimum value $N_{min}$ of the multiple selection range calculated in step S15 of the multiples determined in step S13 (S16). In step S15, one of several well-known random selection algorithms may be applied. The switching frequency calculator 67 may then be configured to determine a switching frequency Fsw by multiplying one multiple $N_{op}$ randomly selected in step S16 by an electrical frequency Fe corresponding to the measured speed of the motor. The switching frequency Fsw determined by the switching frequency calculator 67 is the switching frequency of a pulse width modulation signal for operating the switching devices S1~S6 of the inverter 30. The switching frequency calculator 67 may be configured to provide the determined switching frequency Fsw to the voltage modulator 123 (S14).

The voltage converter 123 may be configured to receive input of the voltage instruction $V_{dqss}$REF and a switching frequency $F_{sw}$ (or a carrier frequency) and generate a pulse width modulation signal for determining on/off states of the switching devices in the inverter 30 based on the voltage instruction and the switching frequency (S18). As described above, in step S18, the voltage modulator 123 may be configured to generate a carrier signal having a triangular waveform that corresponds to the switching frequency $F_{sw}$ (carrier frequency) determined by the switching frequency calculator 67 and generate a pulse width modulation signal having a spherical waveform by comparing the carrier signal with the d/q-axial voltage instruction $V_{dqss}$Ref.

The pulse width modulation signal generated by the voltage modulator 123 may be provided to the gates of the switching devices S1~S6 in the inverter 30, whereby the on/off states of the switching devices S1~S6 may be adjusted. The series of control flow shown in FIG. 6 may be continuously repeated while a motor is driven, and thus, a switching frequency may be randomly determined each time the control flow is repeated.

As described above, the apparatus and method for controlling an inverter driving a motor according to several exemplary embodiments of the present disclosure may randomly change the switching frequency of an inverter such that the randomly changed switching frequency may be determined as one of several switching frequencies that may be applied to synchronization pulse width control. Accordingly, the apparatus and method for controlling an inverter driving a motor according to several exemplary embodiments of the present disclosure may achieve both of the effect of reducing noise and vibration by random pulse width modulation control and the effect of reducing a harmonic frequency by synchronization pulse width control.

Although the present disclosure was provided above in relation to specific exemplary embodiments shown in the drawings, it is apparent to those skilled in the art that the present disclosure may be changed and modified in various ways without departing from the scope of the present disclosure, which is described in the following claims.

What is claimed is:

1. An apparatus for controlling an inverter driving a motor, comprising:
   a current controller configured to generate a voltage instruction to cause a current detection value, obtained by measuring a current provided from an inverter to a motor, to correspond to a current instruction for driving the motor;
   a voltage modulator configured to generate a pulse width modulation signal for controlling on/off states of switching devices in the inverter at a switching frequency based on the voltage instruction; and
   a frequency determiner configured to determine the switching frequency based on driving information of the motor, determine a plurality of synchronization frequencies based on a speed of the motor, and randomly select and determine one of the plurality of synchronization frequencies as the switching frequency.

2. The apparatus of claim 1, wherein the frequency determiner is configured to determine a change range of the switching frequency based on the driving information, determine the predetermined plurality of synchronization frequencies to be used when synchronization pulse width modulation is applied based on a speed of the motor within the determined change range, and randomly select and determine one of the determined plurality of synchronization frequencies as the switching frequency.

3. The apparatus of claim 1, wherein the frequency determiner includes:
   a random band creator configured to determine a change width of the switching frequency based on the driving information;
   a fundamental frequency creator configured to generate a fundamental frequency that is a reference for determining the switching frequency;
   a multiple determiner configured to determine a plurality of multiples for determining the predetermined plurality of synchronization frequencies to be used when synchronization pulse width modulation is applied; and
   a switching frequency calculator configured to determine a multiple selection range based on a maximum frequency and a minimum frequency, which are generated by applying the frequency change width around the fundamental frequency, and the rotational speed of the motor, randomly select one of multiples within the multiple selection range from the multiples determined by the multiple determiner, and determine the switching frequency based on the randomly selected multiple and the rotational speed of the motor.

4. The apparatus of claim 3, wherein the switching frequency calculator is configured to determine a maximum value and a minimum value of the multiple selection range by dividing each of the maximum frequency and the minimum frequency by an electrical frequency corresponding to a speed of the motor.

5. The apparatus of claim 3, wherein the switching frequency calculator is configured to determine the switching frequency by multiplying the randomly selected multiple by an electrical frequency corresponding to a speed of the motor.

6. The apparatus of claim 3, wherein the random band creator includes:
   a cost function calculator configured to calculate one cost value using a cost function having all of a plurality items of the input driving information as variables; and
   a data map configured to store, in advance, the frequency change width mapped to the cost value, receive input of the cost value calculated by the cost function calculator, and output a frequency change width mapped to the cost value.

7. The apparatus of claim 3, wherein the random band creator includes:
   a plurality of cost function calculators respectively including cost functions respectively having a plurality items of the input driving information as variables and configured to calculate a cost value for each of the items of driving information; and
   a data map configured to store, in advance, the frequency change width mapped to the cost value, receive input of a maximum value of the cost values calculated by the plurality of cost function calculators, and output a frequency change width mapped to the maximum value.

8. The apparatus of claim 6, wherein the driving information includes the current instruction, the current detection value, temperature of the inverter, temperature of the motor, and a speed of the motor.

9. The apparatus of claim 6, wherein the cost function calculator includes a cost function that outputs a greater cost value as a tendency of the input motor driving information showing a state in which controllability is deteriorated increases, and the data map is mapped to decrease the frequency change width as the cost values increase.

10. The apparatus of claim 1, further comprising:
    a voltage modulator configured to generate a carrier signal having a triangular waveform having a frequency corresponding to the switching frequency determined by the frequency determiner and generate the pulse width modulation signal having a spherical waveform by comparing the voltage instruction and the carrier signal.

11. A method for controlling an inverter driving a motor, comprising:
    generating, by a controller, a fundamental frequency that is a reference for determining a switching frequency of a switching device in an inverter;
    determining, by the controller, a frequency change width for changing the switching frequency based on driving information of a motor that is operated by driving power provided from the inverter;
    determining, by the controller, a plurality of multiples for determining a plurality of predetermined synchronization frequencies to be used when synchronization pulse width modulation is applied;
    determining, by the controller, a frequency change range by applying the frequency change width around the fundamental frequency;
    determining, by the controller, a multiple selection range by applying a speed of the motor to a maximum frequency and a minimum frequency of the frequency change range;
    randomly selecting, by the controller, one multiple from a plurality of multiples existing between a maximum value and minimum value of the multiple selection range of the multiples determined by the determining of a plurality of multiples; and
    determining, by the controller, the switching frequency based on the multiple randomly selected in the selecting of one multiple and a speed of the motor.

12. The method of claim 11, further comprising:
    generating, by the controller, a carrier signal having a triangular waveform having a frequency corresponding to the switching frequency determined in the determining of the switching frequency; and
    generating, by the controller, a pulse width modulation signal having a spherical waveform by comparing the carrier signal and a voltage instruction determined to adjust a current detection value obtained by measuring a current provided from the inverter to the motor to correspond to a current instruction for driving the motor.

13. The method of claim 11, wherein the determining of a multiple selection range includes determining a maximum value and a minimum value of the multiple selection range by dividing each of the maximum frequency and the minimum frequency by an electrical frequency corresponding to a speed of the motor.

14. The method of claim 11, wherein the determining of the switching frequency includes determining the switching frequency by multiplying the randomly selected multiple by an electrical frequency corresponding to a speed of the motor.

15. The method of claim 11, wherein the determining of a switching change width includes calculating one cost value using a cost function having all of a plurality items of the driving information as variables, and determining the frequency change width by inputting the calculated cost value to a data map configured to store, in advance, the frequency change width mapped to the cost value.

16. The method of claim 11, wherein the determining of a switching change width includes calculating a plurality of cost values using cost functions respectively having a plurality items of the driving information as variables, and determining the frequency change width by inputting a maximum value of the plurality of cost values to a data map configured to store, in advance, the frequency change width mapped to the cost value.

17. The method of claim 15, wherein the driving information includes the current instruction, the current detection value, temperature of the inverter, temperature of the motor, and a speed of the motor.

18. The method of claim 15, wherein the cost function outputs a greater cost value as a tendency of the motor driving information showing a state in which controllability is deteriorated increases, and the data map is mapped to decrease the frequency change width as the cost values increase.

* * * * *